H. SMITH.
HORSE-COLLAR.
No. 172,668. Patented Jan. 25, 1876.
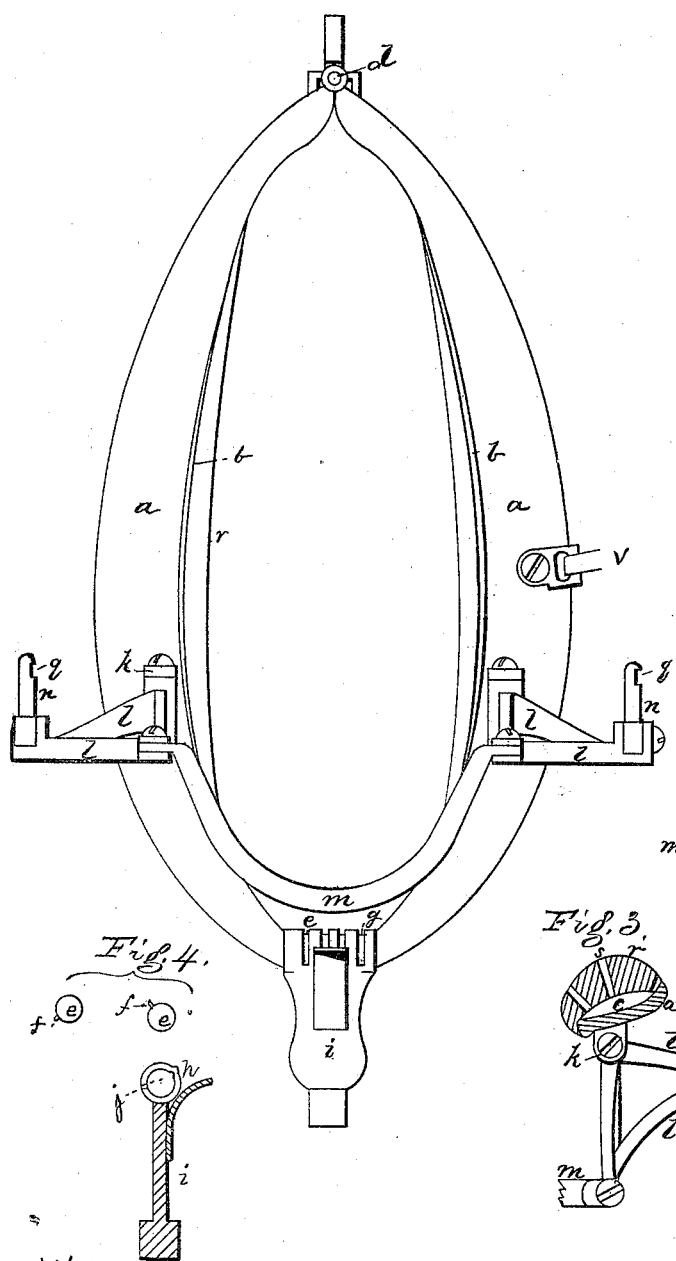
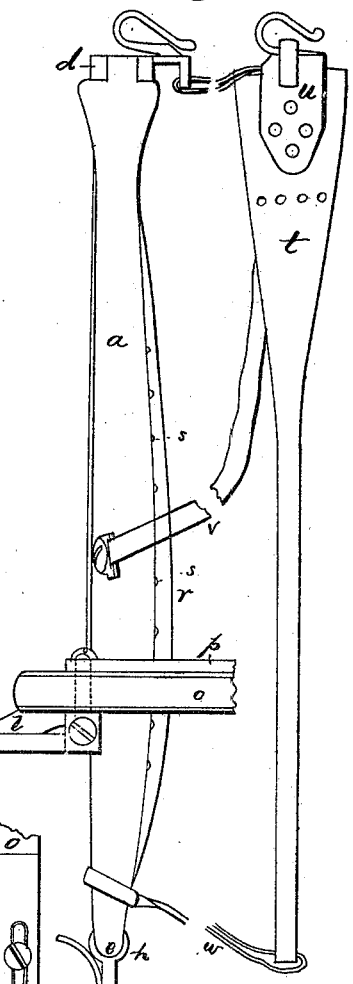
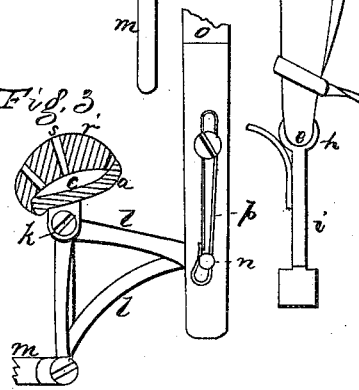
Witnesses.
L. H. Latimer.
W. J. Pratt.
Inventor-
Hugh Smith
per Crosby Gregory Attys.

UNITED STATES PATENT OFFICE.

HUGH SMITH, OF GRAY, MAINE.

IMPROVEMENT IN HORSE-COLLARS.

Specification forming part of Letters Patent No. 172,668, dated January 25, 1876; application filed January 3, 1876.

*To all whom it may concern:*

Be it known that I, HUGH SMITH, of Gray, Cumberland county, and State of Maine, have invented an Improvements in Harness for Horses, of which the following is a specification:

This invention relates to improvements in harness for horses; and consists in a rigid collar provided with pivoted shaft-attaching levers connected at the front of the collar by a curved link, whereby the collar can move readily under the action of the shoulders of the horse, and yet permit the collar to pull steadily on the load, the levers moving as the ordinary whiffletree; also, in the combination, with the collar and the body-strap, of collar-lifting straps extending from the collar to the body-strap, and adapted to lift the upper part of the collar from the upper side of the neck of the horse when the horse is holding back; also, in a metallic collar, in combination with a wooden lining or interior shell perforated for the purposes of ventilation and to permit the passage of perspiration; also, in the combination, with the collar ends, provided with parallel rows of pins, of a fastening device provided with annular slots and a longitudinal groove, whereby the lower ends of either collar may be removed without liability of withdrawing the opposite end of the collar from the fastening.

Figure 1 represents a front view of the main parts of my invention; Fig. 2, a side view of my invention; Fig. 3, a section taken through one side of the collar just above the shaft-attaching lever; and Fig. 4 is a section of the collar or hame fastening and sections of the collar or hame ends with their pins.

The collar is composed of two metallic shells, *a a*, preferably provided with a strengthening-bead, *b*, and concaved at their inner faces *c*, connected at top by means of a hinged joint, *d*.

The lower end *e* of each half of the collar extends in a direction at right angles to the pin of the hinge *d*, and each end is provided with two or more pins, *f*, at distances apart to correspond with the annular passages or slots *g* in the hub *h* of the collar or hame-fastening *i*, the hub being also provided with a longitudinal groove, *j*.

It will be noticed in Fig. 4 that the pins *f* of the collar ends *e* are not in like positions, but are parallel with each other, and these pins are so placed that both of the collar ends cannot present their pins at the same time in the line of the longitudinal passage or groove *j* in the fastening, and therefore but one of the collar ends can be drawn from the fastening at once, and the result is the collar or hame fastening is not liable to become disengaged from both collar ends at the same time, and it is consequently retained in its proper position ready to again connect the collar ends, this disconnecting and connecting of the collar ends being necessary whenever the collar is to be removed or placed on the neck of a horse.

The lower end of the fastening *i* is preferably weighted so as to retain the fastening in such a position that the pins on the collar ends cannot come opposite the groove *j*.

Shaft-attaching levers *l* are pivoted at the sides of the collar on bolts in ears *k*, and the levers are connected by means of a curved link, *m*, adapted to extend under the neck of the horse and to connect the levers *l*, so as to move together and on their pivots or the collar sides.

Rising from arms of the levers are studs *n*, to which the ends of the shafts *o* are connected, each shaft having one or more holes to fit over such pins, so as to regulate the distance of the horse from the wagon, and each shaft has a spring, *p*, or equivalent, or a suitable holding device to fit the notch *q*, or equivalent, in the pin, so as to certainly and surely retain the shaft end on the pin.

The shoulders of the horse rest and press against the wood, or it may be other lining, at the inner side of the collar, and the collar rocks or moves as the horse moves his shoulders, each side of the collar being moved alternately a little forward of the other side by the movement of the shoulders, the collar moving on the connection between it and the levers, connected, in turn, through the shafts with the load.

The shoulders of the horse would be injured if the levers *l*, to which the shafts are connected, did not swivel or move; but, constructed as shown and described, the collar moves freely in accordance with the movement of the shoulders, and does not produce any jerking or irregular motion to be transmitted to the wagon.

The interior wooden portion $r$ of the collar is secured to the collar by screws or rivets, and is perforated at $s$ to permit the circulation of air and to afford an opportunity for the passage of perspiration through the perforations $s$, and then down between the wooden and metallic portions of the collar, where it is discharged at an opening at the base of the collar.

The body-strap $t$ is provided with a gig-saddle, $u$, of any well-known construction. In the drawing both the gig-saddle and body-strap are perforated for the purpose of ventilation, and the body-strap is buckled about the body as usual. Connected with the collar and with the body-strap is a collar-lifting strap, $v$. When the horse is holding back, or going down hill or backing, the lower end of the collar has a tendency to move forward away from the shoulders, the horse naturally holds up his neck, and the upper portion of the collar then bears down hard on the top of the neck; and to prevent this, and obviate galling the neck, I have arranged the lifting-straps that act to control the movement of the collar and hold it up from or reduce its pressure on the upper portion of the neck at the time when the lower end of the collar is thrown forward. Martingales $w$ extend from the lower end of the collar to the body-strap; and, if desired, a crupper-strap may extend backward from the gig-saddle.

The link $m$ may be made of spring-steel, and be sufficiently light to yield a little, this being sometimes desirable with light-draft wagons.

The parts shown enable me to produce a very cheap, durable, and desirable harness, one easily and quickly applied or removed.

The metallic portion of the collar will be preferably made by casting, and may be of iron, malleable iron, or brass, and may be finished in any way that it is common to finish metals.

I am aware that it is not new to use a collar connected directly with the shaft.

I claim—

1. The metallic collar, in combination with the pivoted shaft-connecting levers and lever-connecting link $m$, adapted to operate substantially as described.

2. The collar and levers adapted to be connected directly with the shafts and the body-strap, in combination with the lifting-straps $v$, substantially as described.

3. The metallic collar, in combination with the perforated wooden lining, substantially as described.

4. The collar and its end pieces $e$, provided with pins in different lines, in combination with the fastening $i$, provided with openings or grooves $g$, and with a longitudinal groove, $j$, for the reception and operation of the pins $f$, substantially as described.

In testimony whereof I have signed my name to this specification in the presence of two subscribing witnesses.

HUGH SMITH.

Witnesses:
D. C. STIMSON,
M. MORSE.